United States Patent [19]
Haas

[11] Patent Number: 5,753,292
[45] Date of Patent: May 19, 1998

[54] MULTIPARTITE BAKING FORM AND METHOD FOR MAKING EDIBLE BAKED ARTICLES

[76] Inventor: Nada Haas, Wildpretmarkt 1/12, A-1010, Wien, Austria

[21] Appl. No.: 679,429

[22] Filed: Jul. 8, 1996

[30] Foreign Application Priority Data

Jul. 7, 1995 [AT] Austria ..................... 1158/95

[51] Int. Cl.⁶ ............... A21C 11/00; A21D 8/00
[52] U.S. Cl. ............... 426/523; 99/383; 99/442; 425/417; 425/438; 426/391
[58] Field of Search .............. 426/523, 391, 426/139; 425/412, 417, 348 S, 438, 443; 99/383, 442

[56] References Cited

U.S. PATENT DOCUMENTS

| | | | |
|---|---|---|---|
| 1,416,889 | 5/1922 | Sharp | 426/391 |
| 1,438,541 | 12/1922 | McLaren | 426/391 |
| 4,694,741 | 9/1987 | Haas, Sr. et al. | 99/383 |

*Primary Examiner*—George Yeung
*Attorney, Agent, or Firm*—Herbert Dubno

[57] ABSTRACT

A downwardly tapering core forms a guide part for an end portion which can be pushed into the core so as to be flush therewith when the core is introduced into a downwardly tapering cavity in the form member in the production of ice cream cups, cones or the like. Upon an initial baking of the dough to increase the resistance thereof, the core can be pressed further into the dough to compress the latter into final thickness, whereupon baking can occur with the end portion fully pressed into the guide part.

12 Claims, 5 Drawing Sheets

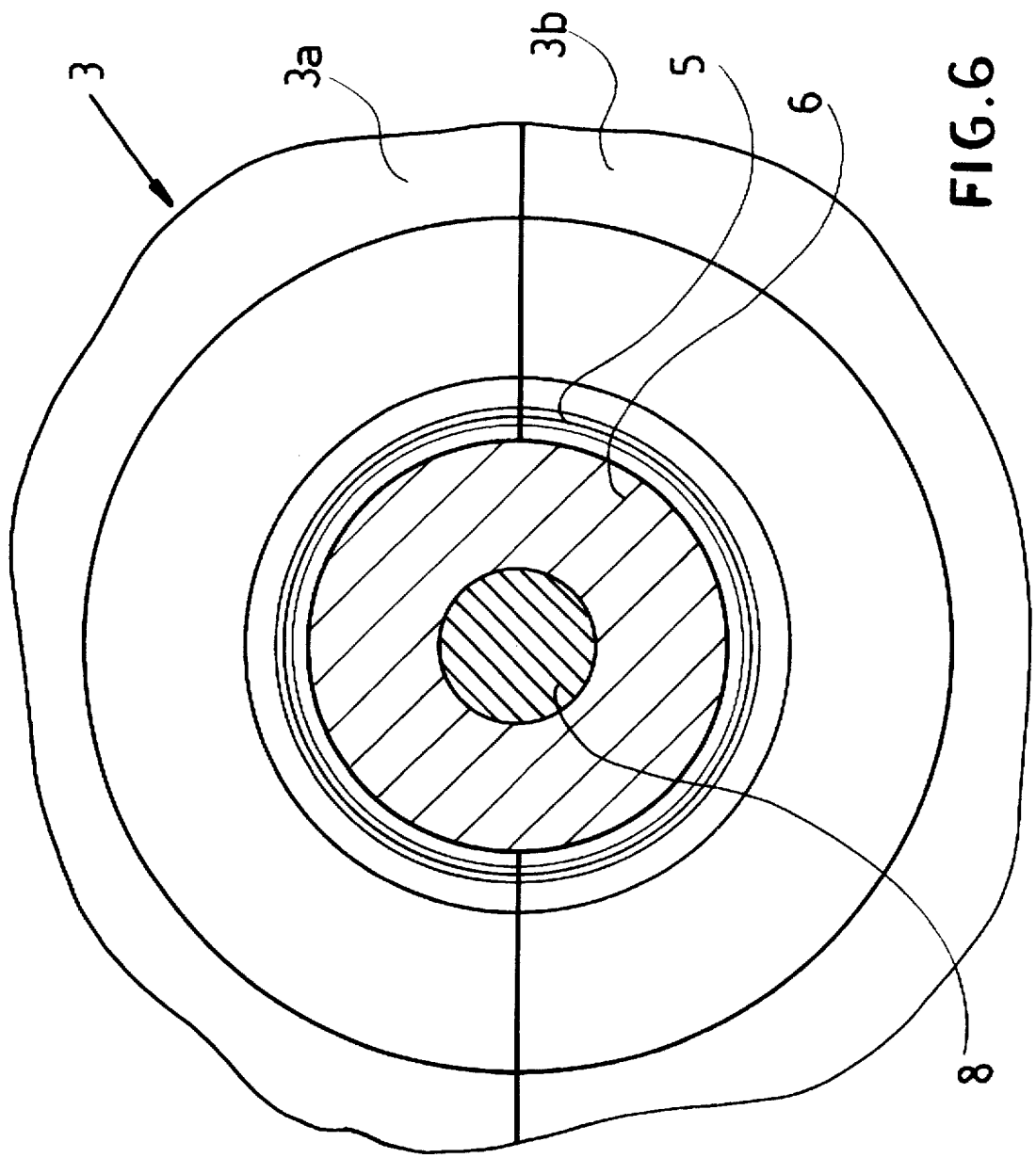

MULTIPARTITE BAKING FORM AND METHOD FOR MAKING EDIBLE BAKED ARTICLES

FIELD OF THE INVENTION

The present invention relates to a multipartite baking form for producing an edible baked article, especially an ice cream cone or cornet, a cup or dish for the service of ice cream and, in particular, which is composed of a waffle dough or a starch-based dough or bakable composition. The invention also relates to a method of making such articles.

BACKGROUND OF THE INVENTION

Conical or frustopyramidical receptacles for ice cream, namely, ice cream cones, cups or dishes, can be fabricated from a waffle dough or a starch-based dough or other bakable composition so that the resulting article is edible or highly biodegradable. In the case of an ice cream cone or a cup or dish with a frustopyramidical shape, a baking form is used which usually has a two part bottom member formed with a cavity and an upper member with a tapered formation adapted to extend into the cavity to define therewith a space whose width is equal to the thickness of the article to be produced and which has the inner contour of the baked article while the outer contour is defined by the inner wall of the cavity.

In commercial production of cornets and especially ice cream cones, i.e. cups or other edible or biologically degradable articles of this type utilizing fully automatic machines, such multipartite backing forms are used with the lower form part being in turn composed of two halves to allow the baked article to be readily removed. A portion of dough or of the bakable composition is placed in the cavity and is pressed by the core to fill the space between the core and the cavity wall, thereby determining the wall thickness of the article, whereupon the form is heated and baking is effected.

Such a system is described in U.S. Pat. No. 1,438,541. If the conical core is introduced into the cavity in this system, because of the coaxial geometry of the cavity and the core, a greater volume of dough is found in the region of the tip of the cone then along the upwardly divergent wall. To produce a uniform homogeneous baked product, it is desirable that the wall thickness be constant even in the tip region of a cone or cornet or in the bottom region of a frustopyramidical or frustoconical structure. Such uniformity is also desirable in the end product and is also desirable for intervening stages whereby, for example, the core can be pressed slowly into the mass in a prebaking phase whereby a thick walled intermediate can be pressed into the final wall thickness and then finish baked.

Problems have been encountered with such systems in the past and an improvement in the multipartite form and in the use thereof has been desired.

OBJECTS OF THE INVENTION

It is, therefore, the principal object of the present invention to provide an improved multipartite baking form which can be used to produce ice cream and like cones, cornets, ice cream cups, dishes and the like without the drawbacks of earlier systems.

Another object of the invention is to provide an improved method of producing baked articles and especially ice cream cones, cups and dishes.

Yet another object of the invention is to provide an improved baking form and method which will avoid greater accumulations of the dough at the tip or bottom regions of the article whether the latter is of a conical configuration or a frustoconical or frustopyramidical configuration.

SUMMARY OF THE INVENTION

The invention attacks a problem encountered with the baking of such articles previously in that, in the past, when baking was commenced after a given wall thickness was established for the entire article by confining the dough in a compartment of constant width, it was found that nonuniformities with respect to compression and the like, led to inhomogeneous products. When a prebaking phase was provided with a constant greater thickness of the dough, it was difficult, if not impossible, to displace the partly stabilized dough structure to obtain a uniform product of reduced thickness.

In both cases, difficulties were encountered with respect to the brittleness of the product and its optical qualities, including the discoloration.

Higher concentrations of the dough in certain regions mean the presence of greater amounts of water which, upon evaporation in the baking process, led to damage to the article.

All of these drawbacks are avoided, in accordance with the invention by providing the core with an end portion which telescopingly is movable back and forth within the core. It has been found to be advantageous to provide this end portion with a shaft which is guided in a central bore or recess forming a guide portion of the core.

For the production of ice cream cones it is advantageous to subdivide the core transversely to its central axis so that the end portion forms one part and the guide portion of the cone the other part, the conical end portion being flush with the conical guide portion when the end portion is pressed into the guide portion.

With this construction, the end portions can project from the core drawing the insertion of the core into the cavity and during the movement of the core to distribute the dough mass therein. In an intermediate position of the Core the dough mass can be subjected to a prebaking, whereupon, with the end portion projecting out of the core, the dough can surround the end portion annularly and thus have a more or less uniform wall thickness even in the prebaking stage when the wall thickness is greater than that of the final baked article to be produced.

The in and out movement of the end portion can be effected by a supplied action during the introduction of the core into the cavity and it has been found to be advantageous to permit the displacement of the end portion between two abutments or stops on the core and to bias the end portion outwardly with at least one spring which can bear upon the end portion.

Once the dough has been prebaked and thus has a certain stability, the core can be advanced in the cavity once again to press the prebaked mass outwardly into the thinner configuration prior to final baking, whereupon the end portion can be pressed inwardly so that its tapered outer surface can be flush with the correspondingly tapered outer surface of the core.

The shaft can have an annular flange which can engage the abutments and the spring can bear upon the shaft.

It has been found to be advantageous to provide a spring so that the force applied by the spring to the end portion is less than the structural strength of the prebaked dough but greater than the steam pressure of the dough mass acting upon the conical surface of the end portion. When reference is made herein to the structural strength of the prebaked dough, I intend thereby to indicate that the dough has a certain resistance to the penetration of the end portion into the dough under the bias of the spring. Alternatively, the force applied by the end portion to the dough can be less than the resistance of the dough in the prebaked state and also less than the steam pressure generated by the dough and acting on the end portion.

When the spring force is greater than the steam pressure the end portion is pushed back into the core by the resistance of the dough mass. When the spring force is smaller than the steam pressure, the pushing back of the end portion into the core is independent of the final position of the core in the baking phase since it is pushed back by the steam development. When the steam pressure falls off because a substantial portion of the water content of the dough has been evaporated, the end portion compresses the baked product and again the resistance of the dough limits outward movement of the end portion.

To achieve ideal baking results and thus a uniform surface with homogeneous coloration and a product which will only pick up a minimum of moisture so that it will not noticeably soften but will be crisp without glassy rupture, I have found that it is advantageous not to bake the dough to the final article shape in a single step after closure of the form. Rather the dough is introduced into the form and the core is moved inwardly and outwardly to distribute the dough and balance the dough uniformly throughout the cavity. The dough is then prebaked with a thickness of 1½ to 3 times the wall thickness of the cone or cup until a structural stability is imparted to the dough. The core is then advanced into the cavity further and the end portion pressed into the core until the tapered surfaces of the core and the end portions are flush with one another and the wall thickness of the dough is at the wall thickness of the desired article, whereupon the baking is completed.

A distribution and partial evaporation of water from the dough has been described in Austrian Patent 240 309 which provides an upper form to allow the steam to escape freely.

The prebaking process at greater wall thickness is effected with the end portion projecting from the core which reduces the dough volume at the tip or bottom. There the wall thickness can be less than that which would result if the end portion was a fixed part of the core.

The mass is pressed to its final wall thickness after it has been prebaked to a certain structural strength and resistance so that the resistance of the dough can press the end portion back into the core. The first phase of the baking process, namely the prebaking can take 20 to 100 seconds depending upon the composition while the finished baking or second stage can take up to 120 seconds.

When the dough is a starch-based product instead of a prebaking or finish baking, a predrying and final drying may suffice.

The multipartite baking form of the invention thus can comprise:

a lower form member provided with a downwardly converging cavity having a cavity wall of an external configuration conforming to that of a baked article to be made in the baking form;

an upper form member provided with a downwardly converging core receivable in the cavity and defining an internal configuration of the baked article and shaping a bakable dough between the core and the cavity wall; and means forming an end portion of the upper form member guided in the core and telescopingly slidable into and out of the core to vary a thickness of the article during at least a drying portion of a baking process for the dough.

The method of the invention can comprise:

(a) introducing a bakable dough into a lower form member of a multipartite baking form provided with a downwardly converging cavity having a cavity wall of an external configuration conforming to that of a baked article to be made in the baking form;

(b) introducing a downwardly converging core of an upper form member of the multipartite baking form having an end portion guided in the core and telescopingly slidable into and out of the core into the cavity;

(c) intermittently displacing the core inwardly and outwardly in the cavity to predistribute and precompact the dough in the cavity;

(d) with the core spaced from the wall to define a thickness of the dough which is one and one-half to three times a wall thickness of the article and with the end portion in an outer position thereof, prebaking the dough to structural stability thereof; and (e) then advancing the core into the cavity to press the end portion into the core and render a tapered surface of the end portion flush with a tapered surface of the core, and effecting a final baking of the dough to form the article.

BRIEF DESCRIPTION OF THE DRAWING

The above and other objects, features, and advantages will become more readily apparent from the following description, reference being made to the accompanying drawing in which:

FIG. 5 is a view similar to FIG. 4 showing the end portion fully pushed in; and

FIG. 6 is a cross sectional view taken along the line VI—VI of FIG. 1.

SPECIFIC DESCRIPTION

Figure 1:
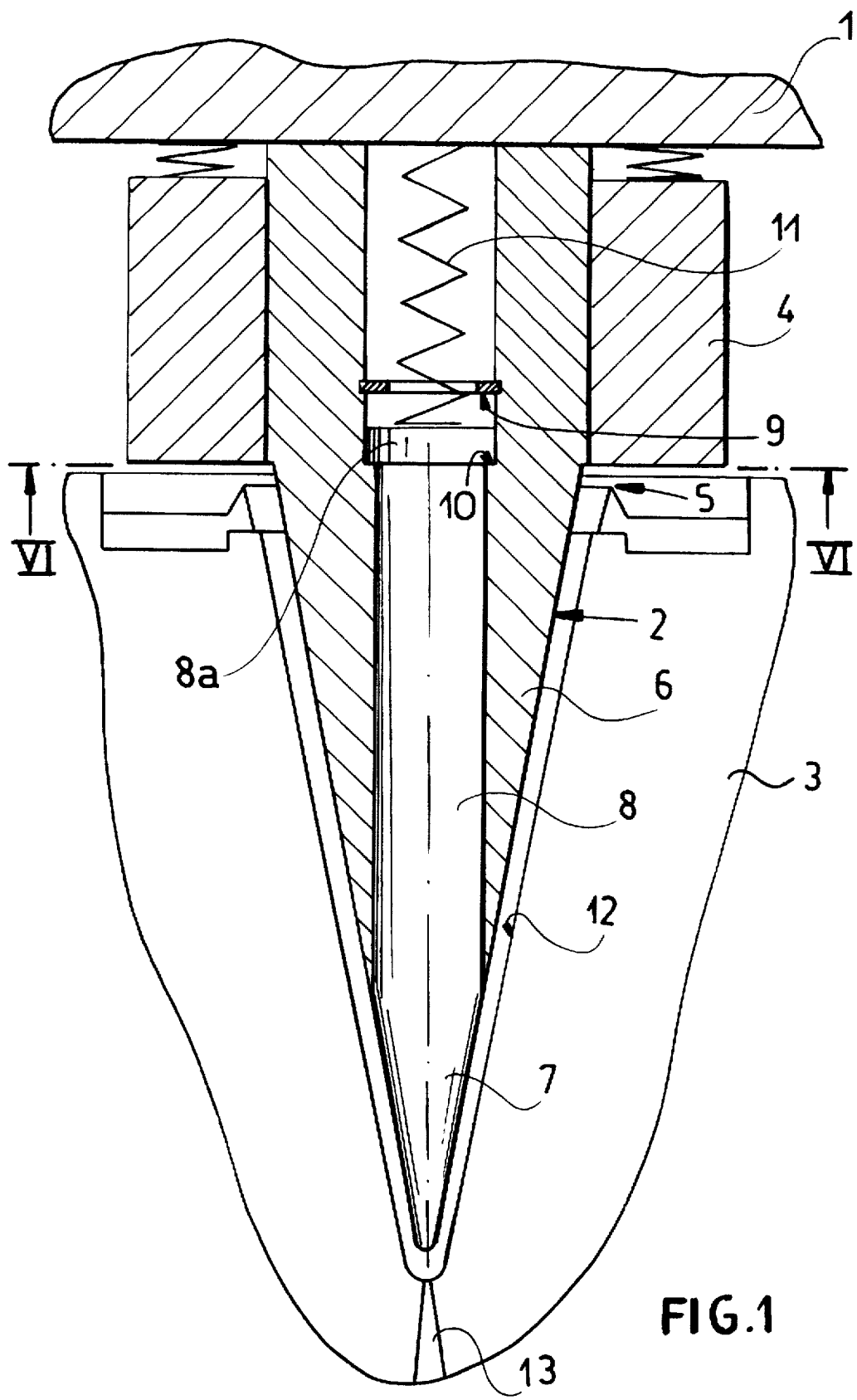
FIG. 1. is an axial section through a baking form which an ice cream cone or cornet showing the position of the core and the end portion immediately prior to the prebaking phase in which the end portion is extended to a maximum from the core.
Figure 2:
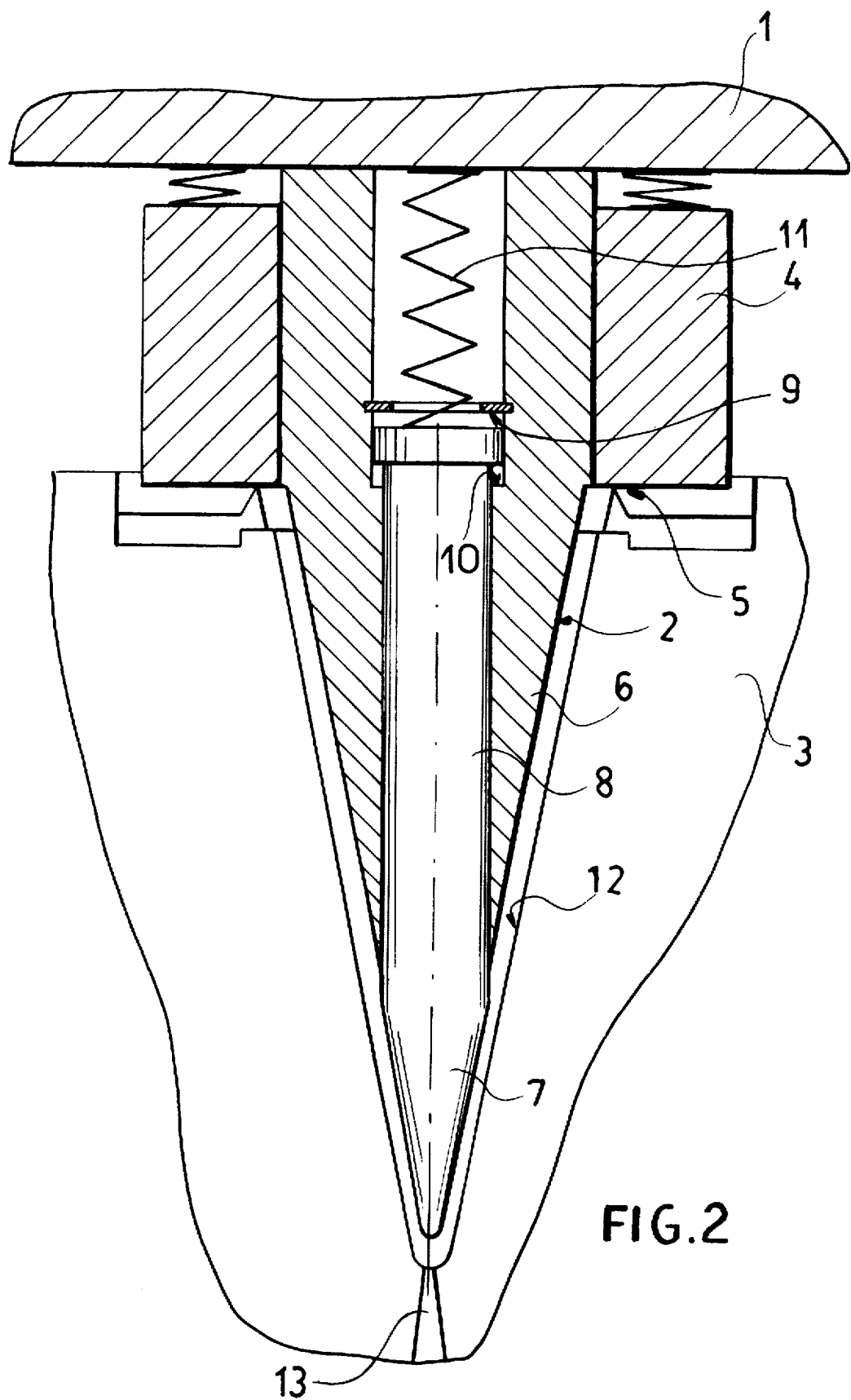
FIG. 2 is a view similar to FIG. 1 but with the baking form fully closed and the end portion partially pushed into the core.
Figure 3:
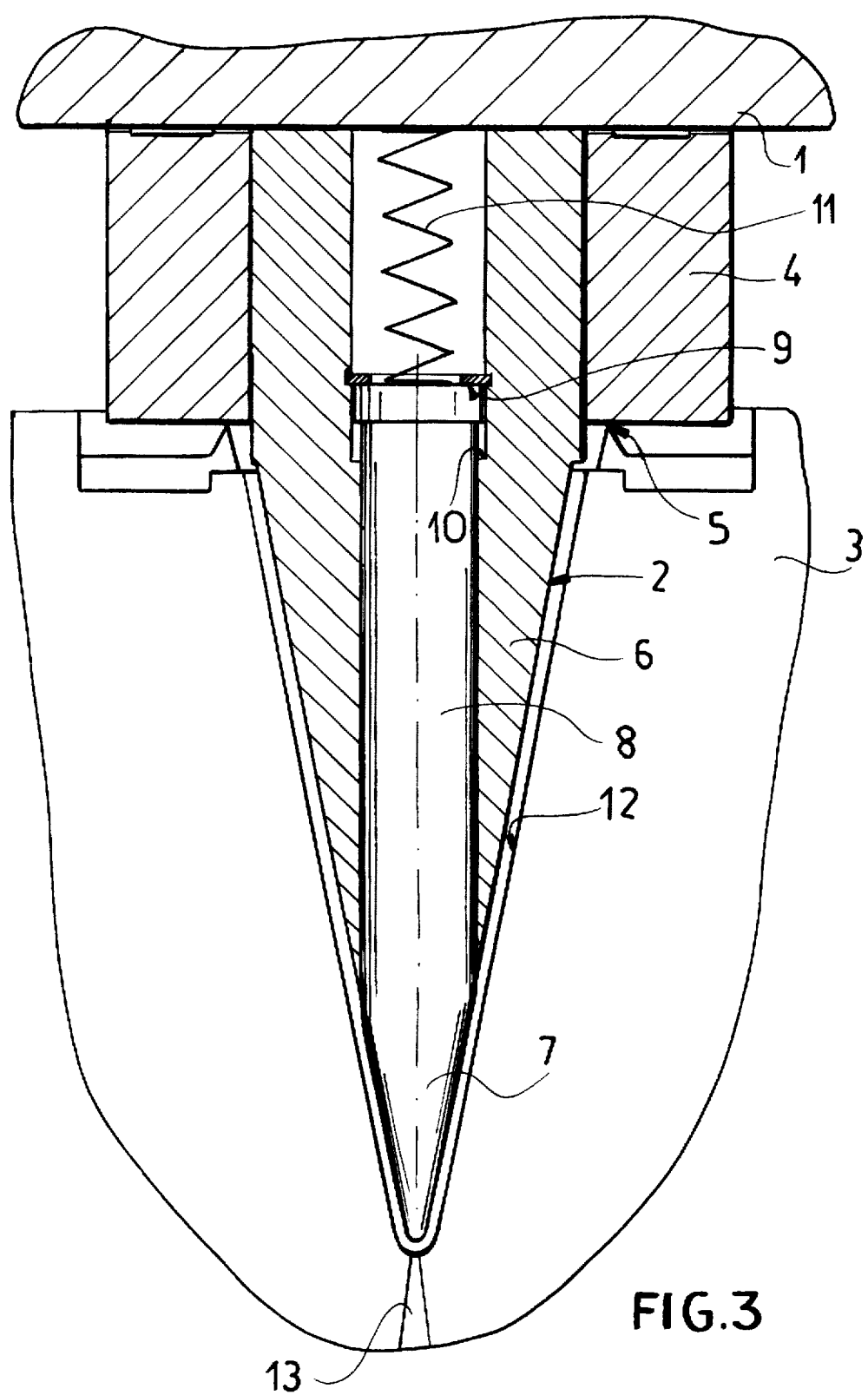
FIG. 3 is a view similar to FIG. 1 with the end portion fully pushed into the core for the finish baking phase.

The multipartite baking form shown in FIGS. 1 and 6 can be used for producing an ice cream cone from a waffle dough, the form comprising a form plate 1 on which a core 2 is rigidly fixed. The core 2 is intended to project into a lower form part 3 which is composed of two parts 3a, 3b which are separable to release the baked article, namely, the ice cream cone. In FIGS. 2 and 3, only half of the lower form part 3 is visible.

The core 2 is surrounded by an annular body 4 spring biased away from the plate 1 and intended to seal against an edge 5 upon lowering of the form plate 1, thereby closing a cavity in which the waffle dough is contained. Depending upon the shape of the ice cream cone to be made, the ring 4 can be either circular or of some other shape and generally follows the periphery of the core 2. Steam outlets can be provided in the annular body 4 but are not, however, visible in FIGS. 1 through 3.

The lower form part 3 has a recess 12 conforming in shape to the external configuration of the ice cream cone to be fabricated and provide at its lower most part with a downwardly widening steam outlet 13.

The core 2 is formed from a conical guide part 6 and a conical end portion 7. The outer surfaces of the guide part 6 and the end portion 7 are conical surfaces which, when the 2 parts are flush with one another, are likewise flush to form a single cone. The outer surfaces thus have the same conicity.

A shaft 8 is affixed to the end portion 7 and is slidable in the guide part 6. A flange 8a on the shaft 8 can engage either of two abutments, namely, a spring ring 9 and a shoulder 10 limiting the displacement of the shaft 8 and thus of the end portion 7 relative to the guide part 6 of the core 2.

A spring 11 is braced against the plate 1 and the shaft 8 and biases the shaft 8 and the end portion 7 to the outer telescoping position as shown in FIG. 1.

The process for producing an edible ice cream cone begins with the introduction of a portion of the bakable dough into the recess 12. For this purpose, the form plate 1 and core 2 are raised to lift the core 2 out of the recess 12. The portion of dough can fill the lower portion of the cavity to approximately half of the height thereof.

With the end portion 7 projecting to a maximum out of the guide part 6, the core 2 is lowered on the plate 1 until the core penetrates into the dough mass and displaces the uniformity over the height of the cavity 12 between the core and the cavity wall.

This process is accompanied by a back and forth movement of the core 2 in the recess. This back and forth movement takes from 15 to 45 seconds, preferably about 30 seconds, the ring 4 being positioned above the sealing edge 5 so that an annular venting gap is provided to allow steam to escape.

FIG. 1 shows the form in its position at the end of this distribution phase and just before commencement of prebaking.

For the production of other baked articles, for example, a dish or container of some other shape with a relatively large bottom area, this back and forth movement can be omitted.

The prebaking phase is effected with a greater wall thickness than that of the section baked article and, preferably, with the end portion 7 in its maximum extended position, over a period of 20 to 100 seconds, preferably about 50 seconds. The wall thickness at the upper portion of the core 2 can be about 3.6 mm and in the region of the outwardly extended end portion 7 about 2.6 mm. Steam passes out of the form through the annular gap between the ring 4 and the sealing edge 5 and from the steam outlet 13. The latter can be conical or pyramidical in shape. The form is then closed. FIG. 2 shows an intermediate position in the closing operation while FIG. 3 shows the final position in which finish baking is carried out for 90 to 120 seconds, preferably about 105 seconds.

Slowly or impulsively, the final wall thickness of about 2 mm over all is established during the finish baking. The end portion 7 is pushed fully into the core 2 and becomes flush therewith as has been shown in FIG. 3 as a result of the resistance of the prebaked dough mass with its increasing structural stability. The ring 4 then seals against the edge 5 and only the lower steam outlet 13 in the separating plane between the two halves 3a, 3b of the lower form but remains open. The shaft 8 engages the abutment 9.

In the fully closed form, the baked article is so compressed that it has a uniform wall thickness of substantially 2 mm residual steam can also emerge between the core 2 and shaft 8 of the end portion 7. Further steam slits can be omitted.

The baked product has homogeneous characteristics, uniform coloration and a surface structure which resists to a high degree any pick up of moisture.

For removal of the cone, the plate 1 is raised, the finished cone is held by the spring loaded ring 4 and the end portion 7 in the lower form part 3 and thus is not raised with the core 2. The two halves 3a and 3b are sprayed apart and the ice cream cone falls out or is removed.

The baking time in the first phase, the prebaking phase depends upon the dimensions of the article and the composition of the dough mass. It can amount to 20 to 100 seconds. The final baking phase can extend to about 120 seconds. The compaction of the mass between FIGS. 2 and 3 tends to insure a closed confined structure of the baked article which makes it less sensitive to moisture than an article baked in a single act. Appearance and strength are largely homogeneous.

Figure 4:
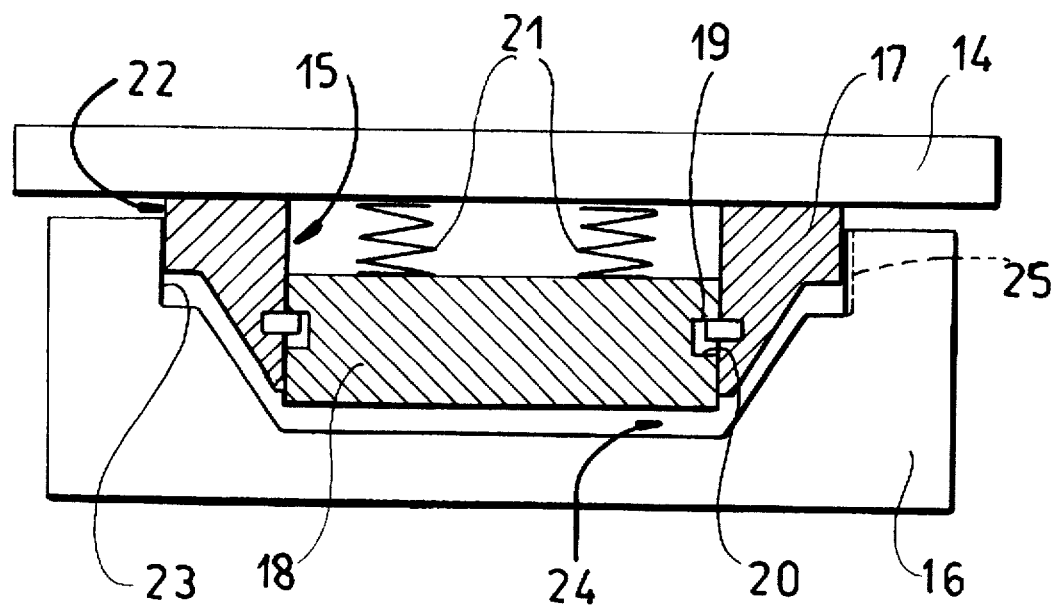
FIG. 4 is a cross sectional view of a baking form for an ice cream dish to be made from a baking mass or dough of a starch base showing the end portion projecting to a maximum from the core.
Figure 5:
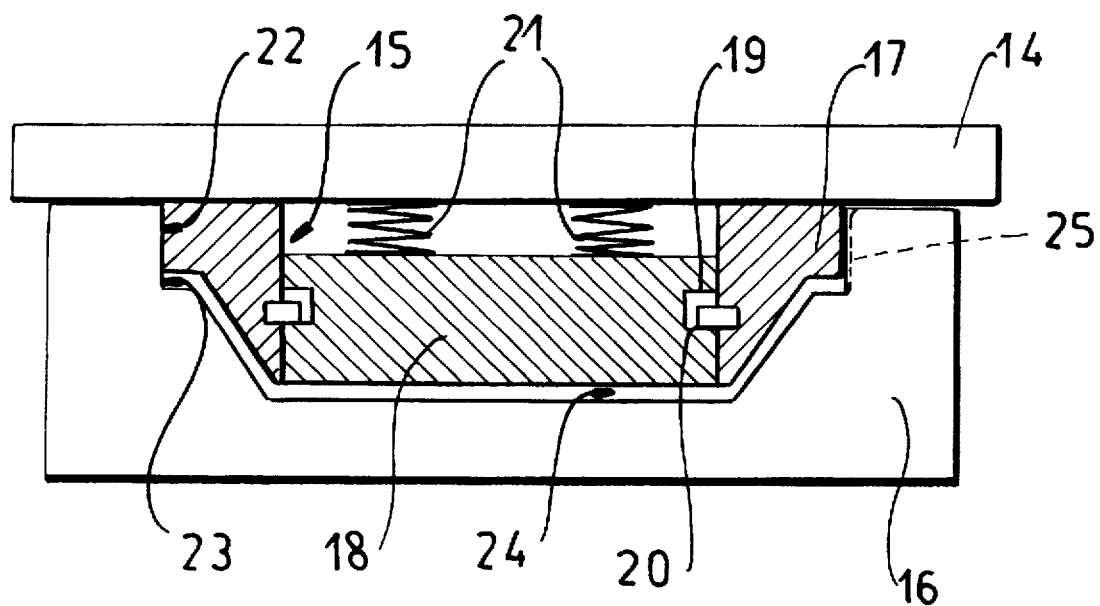

FIGS. 4 and 5 show a baking form having a form plate 14 carrying the core 15 juxtaposed with a two part lower form 16. The core 15 is comprised of a guide part 17 which is tapered away from the plate 14, i.e. has walls which are inclined toward one another downwardly so that they form a frustocone or frustopyramid. The end portion 18 is slidable in the guide part 17 between abutments 19, 20 against the force of the spring 21 and can project from the guide part 17. It can be pressed inwardly against the force of spring 21.

A cylindrical core region 22 which is not necessary circularly cylindrical, seals with a correspondence surface 23 to close the recess 24 in the lower part 16 of the form. The recess 24 has the configuration of the outer surface of the core 15.

The cross sections in FIGS. 4 and 5 can be rotatably symmetrical if the article to be made is a circular plane. They may also be square or rectangular as a frustopyramid cup is to be made.

In any case, a prebaking is carried out in the position shown in FIG. 4 in which the outwardly shifted end portion 18 reduces the wall thickness at the bottom to substantially the same wall thickness as at the sides. When the core is pressed fully into place (FIG. 5) the baked material has a uniform thickness and the end portion 18 is pressed fully into the core.

After the prebaking the structural strength of the baked product, which can be of a starch base, is so great that the compression of the intermediate product to the final wall thickness according to FIG. 5, presses the end portion 18 inwardly. The force of the spring 21 is thus less than the resistance of the prebaked dough. When the spring force is also less than the steam pressure acting upon the end portion 18, the end portion 18 is already pushed into the position shown in FIG. 5 by the steam prior to the precompaction. The prebaked dough is thus compressed in the final position shown in FIG. 5. The multipartite baking form can have additional parts which fit together or which are separable at parting surfaces. The baked articles made and refer to generally as ice cream cones, cups or dishes, can also be fast food packaging, platforms, trays, candy inserts, pocketed packaging structures and other packaging materials. The dough can have a composition suiting the end use, i.e. can be edible or biologically decomposable and can contain grain meal, starch, plant meal or by-products and organic or inorganic additives, stone meal. The core can have one telescoping end portion as has been shown at 7 or 18 or can have a number of such telescoping parts.

The end portion 7 or 18 can be guided in a bore or recess of the core 2 or 15 or the guide part 6 or 17 in an off center manner.

The end portion can also surround the guide part in a sleeve like manner so that the end portion is slidable on the guide part.

I claim:

1. A multipartite baking form, comprising:
    a lower form member provided with a downwardly converging cavity having a cavity wall of an external configuration conforming to that of a baked article to be made in the baking form;
    an upper form member provided with a downwardly converging core receivable in said cavity and defining an internal configuration of said baked article and shaping a bakable dough between said core and said cavity wall; and
    means forming an end portion of said upper form member guided in said core and telescopingly slidable into and out of said core to vary a thickness of said article during at least a drying portion of a baking process for said dough.

2. The multipartite baking form defined in claim 1 wherein said cavity and said core are generally conical and said article is an ice cream cone.

3. The multipartite baking form defined in claim 1 wherein said cavity and said core are generally frustopyramidical and said article is an ice cream cup.

4. The multipartite baking form defined in claim 1 wherein said end portion projects from said cone and is connected to a shaft of substantially constant cross section slidably guided in a bore in said core.

5. The multipartite baking form defined in claim 1 wherein said end portion is conical and extends over a substantial part of the height of the cavity to form a bottom portion of an ice cream cone, said core having substantially the same conicity as said end portion, said end portion being connected to a cylindrical shaft guided in a cylindrical bore of said core.

6. The multipartite baking form defined in claim 5, further comprising a pair of abutments on said core respectively limiting inward movement of said end portion and outward movement of said end portion, said baking form further comprising a spring biasing said end portion outwardly from core, said end portion having an outer surface flush with an outer surface of said core in an inner position of said end portion.

7. The multipartite baking form defined in claim 6 wherein said spring is dimensioned such that outward force applied by said end portion to said dough is less than a structural strength of said dough in at least a partially baked condition thereof, and also less than a steam pressure of said dough acting upon said end portion.

8. The multipartite baking form defined in claim 6 wherein said spring is dimensioned such that outward force applied by said end portion to said dough is less than a structural strength of said dough in at least a partially baked condition thereof, and greater than a steam pressure of said dough acting upon said end portion.

9. The multipartite baking form defined in claim 1, further comprising a steam outlet at a lowest portion of said cavity.

10. A method of baking an article, comprising the steps of:
    (a) introducing a bakable dough into a lower form member of a multipartite baking form provided with a downwardly converging cavity having a cavity wall of an external configuration conforming to that of a baked article to be made in the baking form;
    (b) introducing a downwardly converging core of an upper form member of said multipartite baking form having an end portion guided in said core and telescopingly slidable into and out of said core into said cavity;
    (c) intermittently displacing said core inwardly and outwardly in said cavity to predistribute and precompact said dough in said cavity;
    (d) with said core spaced from said wall to define a thickness of the dough which is one and one-half to three times a wall thickness of said article and with said end portion in an outer position thereof, prebaking said dough to structural stability thereof; and
    (e) then advancing said core into said cavity to press said end portion into said core and render a tapered surface of said end portion flush with a tapered surface of said core, and effecting a final baking of the dough to form said article.

11. The method defined in claim 9 wherein said tapered surfaces are generally conical and the article formed is an ice cream cone.

12. The method defined in claim 9 wherein said tapered surfaces are generally frustopyramidical and the article formed is an ice cream cup.

* * * * *